United States Patent
Nakayama et al.

(10) Patent No.: US 11,009,627 B2
(45) Date of Patent: May 18, 2021

(54) ANTIREFLECTIVE OPTICAL MEMBER AND METHOD FOR PRODUCING ANTIREFLECTIVE OPTICAL MEMBER

(71) Applicant: CANON KABUSHIKI KAISHA, Tokyo (JP)

(72) Inventors: Tomonari Nakayama, Yokohama (JP); Kenji Makino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 15/911,704

(22) Filed: Mar. 5, 2018

(65) Prior Publication Data
US 2018/0259680 A1   Sep. 13, 2018

(30) Foreign Application Priority Data
Mar. 10, 2017 (JP) .............................. JP2017-046632

(51) Int. Cl.
*G02B 1/111* (2015.01)
*C09D 1/00* (2006.01)
*C09D 5/00* (2006.01)

(52) U.S. Cl.
CPC .............. *G02B 1/111* (2013.01); *C09D 1/00* (2013.01); *C09D 5/006* (2013.01); *G02B 2207/107* (2013.01)

(58) Field of Classification Search
CPC .............. B32B 7/00–7/14; G02B 1/11–1/118
See application file for complete search history.

(56) References Cited

U.S. PATENT DOCUMENTS

| 2009/0220774 A1* | 9/2009 | Imai | G02B 1/11 428/331 |
| 2011/0195239 A1* | 8/2011 | Takane | G02B 1/118 428/206 |
| 2013/0011608 A1* | 1/2013 | Wolk | C09J 133/08 428/141 |
| 2013/0034722 A1* | 2/2013 | Kalyankar | G02B 1/11 428/317.5 |
| 2013/0337161 A1* | 12/2013 | Akimoto | C08J 7/0427 427/162 |
| 2014/0178657 A1* | 6/2014 | Jewhurst | G02B 1/115 428/212 |

(Continued)

FOREIGN PATENT DOCUMENTS

| JP | 2001188104 A | 7/2001 |
| JP | 2005157037 A | 6/2005 |
| JP | 2007065522 A | 3/2007 |

(Continued)

OTHER PUBLICATIONS

Machine translation of JP2011-057589. Retrieved Dec. 5, 2019.*

(Continued)

*Primary Examiner* — Prashant J Khatri
(74) *Attorney, Agent, or Firm* — Canon U.S.A, , Inc. IP Division

(57) ABSTRACT

There is provided an optical member including a porous layer on a substrate, wherein the porous layer contains silicon oxide particles, a silicon oxide binder, and a fluorine compound having a fluorocarbon group and a nonionic hydrophilic group, and the amount of the fluorine compound is 0.1% by mass or more and 2.5% by mass or less with respect to the silicon oxide.

17 Claims, 6 Drawing Sheets

(56) References Cited

U.S. PATENT DOCUMENTS

2016/0025899 A1* 1/2016 Ishizeki ................ C03C 17/006
  428/141
2016/0170094 A1 6/2016 Nakayama

FOREIGN PATENT DOCUMENTS

JP  2011057589 A * 3/2011
WO 2012022983 A1  2/2012

OTHER PUBLICATIONS

Blahnik et al. "About the reduction of reflections for camera lenses: How T*-coating made glass invisible". Carl Zeiss AG, (Mar. 2016); pp. 1-74.*

* cited by examiner

ANTIREFLECTIVE OPTICAL MEMBER AND METHOD FOR PRODUCING ANTIREFLECTIVE OPTICAL MEMBER

BACKGROUND

Field of the Disclosure

The present disclosure relates to an optical member exhibiting low scattering and having an excellent antireflection performance and a method for manufacturing the optical member.

Description of the Related Art

It has been conventionally known to form antireflection films on which a single layer or multiple layers is/are laminated by optical film(s) having different refractive indices at a thickness of several ten to several hundred nanometers. In order to form these antireflection films, vacuum film formation processes such as deposition and sputtering, and wet film formation processes such as dip coat and spin coat are used.

It is known that, for the material for use in a surface layer of an antireflection film, inorganic materials such as silica (silicon oxide), magnesium fluoride and calcium fluoride, organic materials such as silicone resins and amorphous fluorine resins, which have low refractive indices and are transparent, are used.

It has been known in recent years to use a low-refractive-index film utilizing the refractive index of air of 1.0 in an antireflection film so as to suppress a reflectance to be lower. It is possible to decrease a refractive index by forming spaces in a layer of silica or magnesium fluoride. For example, if spaces are formed at 30% volume in a thin film of magnesium fluoride having a refractive index of 1.38, the refractive index can be decreased to 1.27.

As a method for forming spaces in a film, a method including applying a dispersion liquid of silicon oxide particles and drying the dispersion liquid is known. However, if the dispersion state of the particles in the dispersion liquid is bad, scattering occurs significantly due to aggregation of the particles.

Therefore, Japanese Patent Laid-Open No. 2007-065522 discloses a method for forming an antireflection film from a particle slurry in which the aggregation of particles is suppressed by adding a dispersant having high affinity to solvents.

Japanese Patent Laid-Open No. 2001-188104 discloses a method for forming an antireflection film by combining particles having improved affinity with polymers by undergoing a surface treatment, and a polymer binder.

SUMMARY OF THE DISCLOSURE

The optical member according to the present disclosure is an optical member including a porous layer on a substrate, wherein the porous layer contains hydrophilic and chainlike silicon oxide particles, a silicon oxide binder, and a fluorine compound having a fluorocarbon group and a nonionic hydrophilic group,
wherein the amount of the fluorine compound is 0.1% by mass or more and 2.5% by mass or less with respect to the silicon oxide.

Furthermore, the method for manufacturing an optical member according to the present disclosure is a method for manufacturing an optical member having a porous layer on a substrate, including: forming a coating film by applying onto the substrate a liquid containing hydrophilic and chainlike silicon oxide particles, a silicon oxide binder, a fluorine compound having a fluorocarbon group and a nonionic hydrophilic group and a solvent; and forming a porous layer by drying and/or baking the substrate on which the coating film has been formed, wherein the amount of the fluorine compound contained in the liquid is 0.1% by mass or more and 2.5% by mass or less with respect to the silicon oxide contained in the silicon oxide particles and the silicon oxide binder. However, the amount of the silicon oxide contained in the silicon oxide binder refers to a mass when the silicon oxide binder is converted to a silicon oxide by condensation.

Further features of the present disclosure will become apparent from the following description of exemplary embodiments (with reference to the attached drawings).

DESCRIPTION OF THE EMBODIMENTS

In the case of Japanese Patent Laid-Open No. 2007-065522, the dispersant itself has no or little effect to decrease a refractive index. There was a problem that, in order to decrease a refractive index, it was necessary to make spaces by utilizing air bubbles made by vaporizing a solvent, and thus spaces become large and the scattering of the film increases.

In the case of Japanese Patent Laid-Open No. 2001-188104, there was a problem that, although an antireflection film having small scattering can be obtained by the formation of fine spaces, the refractive index of the film increases since both the surface-treated particles and the polymer binder have high refractive indices.

The present disclosure has been made in view of such problem, and provides an optical member that attains a low refractive index and low scattering, and a method for manufacturing an optical member.

The present disclosure will be explained below in detail.

[Optical Member]

Figure 1:
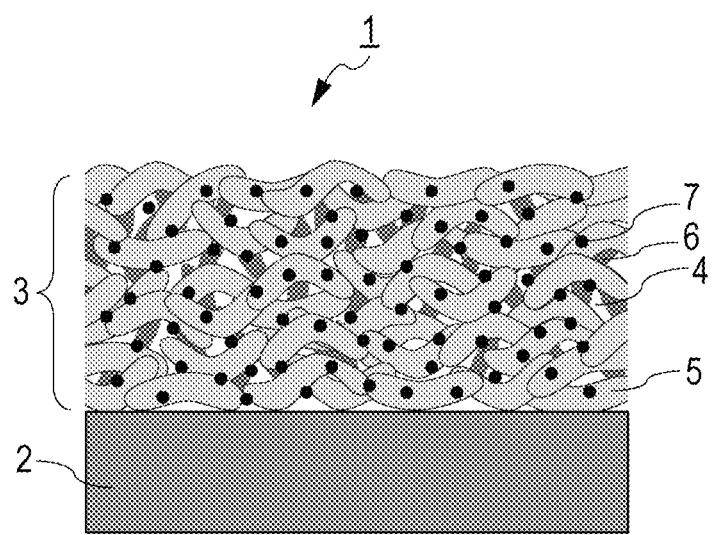
FIG. 1 is a schematic view showing an embodiment of the optical member of the present disclosure.

FIG. 1 is a schematic drawing (image drawing) showing an embodiment the optical member of the present disclosure. The optical member 1 has at least a substrate 2, and a porous layer 3 on the substrate 2. The porous layer 3 contains silicon oxide particles 5, a silicon oxide binder 6 and a fluorine compound 7, a plurality of spaces 4 are present in the film, and the film functions as an antireflection film. The silicon oxide particles 5 are chainlike silicon oxide particles in which a plurality of particles formed of a silicon oxide are bonded by a silicon oxide binder. The fluorine compound 7 has a nonionic hydrophilic group and a fluorocarbon group, and has a role to be chemically adsorbed by the surfaces of the silicon oxide particles 5 and/or the surfaces of the bonding parts of the silicon oxide binder 6 to thereby adjust the size of the spaces 4.

The silicon oxide particles 5 included in the porous layer 3 may be directly in contact with each other, or may be bonded via the binder, and it is preferable that the silicon oxide particles 5 are bonded via the binder in view of improvement of the wearing resistance.

Figure 2:
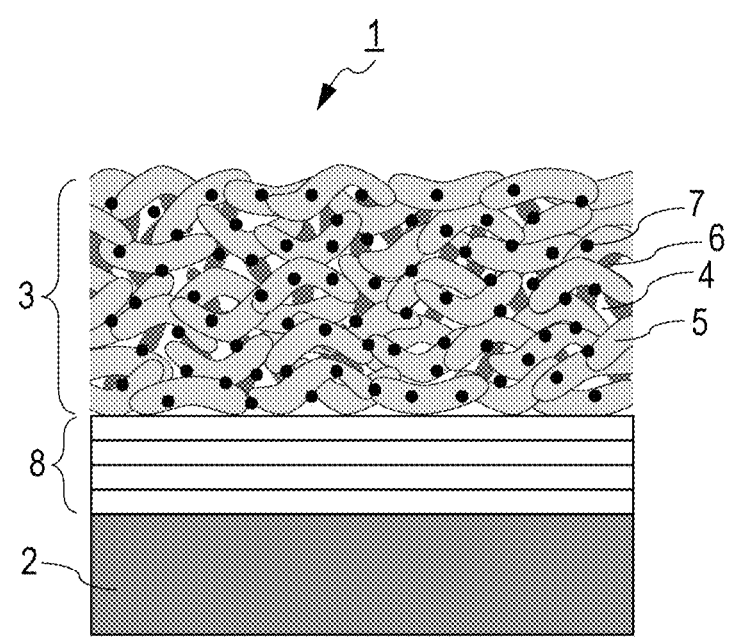
FIG. 2 is a schematic view showing another embodiment of the optical member of the present disclosure.

FIG. 2 is a schematic drawing showing another embodiment of the optical member 1 of the present disclosure. The optical member in FIG. 2 has an oxide laminated body 8 between the substrate 2 and the porous layer 3. The constitution of FIG. 2 can decrease reflection more than the constitution of FIG. 1 does.

The optical member of the present disclosure can be used in an optical lens, an optical mirror, a filter, and an optical film. It is specifically preferable to use the optical member in an optical lens. A clear image can be acquired when the optical member of the present disclosure is used as an optical lens of an imaging apparatus or a cover glass of a lens, and an image of a photographic subject is photographed by an imaging unit via the optical member of the present disclosure.

The respective constitutional members of the optical member 1 will be explained below in detail.

(Substrate)

The substrate 2 is not specifically limited, and substrates made of glasses, resins, and the like can be used. As the glasses, inorganic glasses containing zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, aluminum oxide, and the like can be used. Examples of the resins include polyethylene terephthalate, polyethylene naphthalate, triacetyl cellulose, acryl resin, polycarbonates, cycloolefin polymers, polyvinyl alcohols, and the like.

Furthermore, the shape of the substrate 2 is not limited and may be a plane, a curved surface, a concave surface, a convex surface, or a film shape, and can be formed by a grind polish process, a molding process, a float molding process, or the like.

(Silicon Oxide Particles)

The silicon oxide particles 5 are hydrophilic and chainlike silicon oxide particles.

The chainlike particles (hereinafter also referred to as chainlike particles) are aggregates of particles in which multiple particles are linked in linear or bent manner. Since the linkages in the chainlike particles are maintained even after the particles have been formed into a film, the porosity in the film can be increased more than a case where homogeneous particles are used. Furthermore, if the sizes of the individual particles constituting the chainlike particles are decreased, large spaces that cause scattering are difficult to form. Even in a state that the shapes of the individual particles forming the chainlike silicon oxide particles can be clearly observed, the shapes may also be collapsed, for example, the particles are melt-bonded, and the like.

The chainlike silicon oxide particles are particles each having a random shape with a short diameter and a long diameter, and the short diameter in average is preferably 5 nm or more and 40 nm or less, more preferably 8 nm or more and 30 nm or less. In a case where the chainlike silicon oxide particles have a short diameter in average of less than 5 nm, the surface area of the particles increases, and thus the possibility of decreasing in reliability due to incorporation of moisture from the atmosphere and chemical substances increases. In a case where the short diameter in average goes beyond 40 nm, it is possible that the spaces formed among the particles are enlarged, and voids are generated and scattering occurs. In addition, scattering due to the size of the particles also occurs.

The spaces herein refer to spaces formed among the particles in the film. Furthermore, voids refer to spaces with a size equal to or more than the particle size, which may cause scattering.

The long diameter is preferably 3 times or more and 12 times or less, more preferably 4 times or more and 10 times or less with respect to the short diameter. When the long diameter is less than 3 times with respect to the short diameter, the spaces become too small and thus it is difficult to decrease the refractive index, whereas when the long diameter is more than 12 times, it is possible that voids are formed among particles and scattering occurs.

The average diameter of the silicon oxide particles used herein is an average Feret diameter. This average Feret diameter can be measured by conducing image processing on an image obtained by observing a cross-sectional surface of the film under a transmission electron microscope. As a method for image processing, commercially available image processing such as image Pro PLUS (manufactured by Media Cybernetics, Inc.) can be used. Where necessary, the contrast is adjusted at a predetermined image area, and an average Feret diameter of the particles is measured by a particle measurement, whereby an average value can be calculated and obtained.

The silicon oxide particles 5 may be used by appropriately mixing the chainlike particles with particles having shapes other than the chainlike shape such as a true circular shape, an oval shape, a disc shape, a rod shape, a needle shape, and a square shape. However, the ratio of the mixing of the particles having shapes other than the chainlike shape is preferably 40% by mass or less, more preferably 20% by mass or less with respect to the entirety of the silicon oxide particles 5. If the particles other than the chainlike particles are more than 40% by mass, an effect to decrease the refractive index by the addition of the fluorine compound may not be obtained.

It is preferable that the silicon oxide particles 5 are hydrophilic particles having many silanol (Si—OH) groups on the surfaces of the particles. When there are many silanol groups on the surfaces of the particles, the silicon oxide particles have an effect to increase the dispersibility of the particles in a solvent to thereby enhance the force to allow the particles 5 and the fluorine compound 7 to attract each other. As the hydrophilic silicon oxide particles 5, wet synthesized particles that are produced by subjecting orthosilicic acid ($H_4SiO_4$) as a raw material to hydrothermal synthesis are preferable. Dry synthesized particles can also be used as the hydrophilic silicon oxide particles 5 by forming many silanol groups on the surfaces in advance by using an acidic or alkaline aqueous solution.

The silicon oxide particles 5 are particles containing a silicon oxide as a major component, and a part of the Si elements may be replaced with other elements such as Al, Ti, Zn, Zr, and B, or organic groups may be linked to the Si elements. Also in such case, the elements other than Si among the elements other than oxygen and hydrogen in the silicon oxide particles 5 component are preferably 10 atom % or less, more preferably 5 atom % or less. When the elements other than Si are more than 10 atom %, it is possible that the wearing resistance is lowered since the silanol groups on the surfaces of the particles which contribute to the bonding with the silicon oxide binder 6 decrease.

It is preferable that the surfaces of the silicon oxide particles 5 are constituted by only a silicon oxide and silanols, but it is also acceptable that metal oxides such as $Al_2O_3$, $TiO_2$, $ZnO_2$, and $ZrO_2$ are attached to the surfaces, or a part of the silanols on the surfaces of the particles may be modified with organic groups. However, if the amount of the silanols on the surfaces of the silicon oxide particles 5 is too small, the hydrophilicity of the particles is lost, and thus it is possible that a film using such silicon oxide particles has a lowered film strength due to decrease in the binding sites among the particles or between the particles and the silicon oxide binder 6. Furthermore, it is possible that the interaction between the particles and the fluorine compound 7 decreases, and thus a low refractive index cannot be attained.

(Silicon Oxide Binder)

The silicon oxide binder 6 is a moiety where particles are bonded by siloxane oligomers via silanol groups. Since the siloxane oligomers have high affinity to the silicon oxide particles 5, it can bind the silicon oxide particles 5 by interposing in the particles to thereby improve the wearing resistance of the porous layer 3.

It is preferable that the silicon oxide binder 6 is constituted by only a silicon oxide being free from organic groups in view of improvement of the strength and decreasing of the scattering of the porous layer 3. The silicon oxide binder 6 may contain organic groups instead of the silanol groups as long as the organic groups are 10 mol % or less with respect to the Si atoms. Examples of the organic groups include organic groups such as alkyl groups, alkenyl groups, and alkynyl groups, or organic groups in which a part of those groups are substituted with either of an amino group, an isocyanate group, a mercapto group, an acryloyl group, and halogen atoms.

(Fluorine Compound)

The fluorine compound 7 contained in the porous layer 3 has a fluorocarbon group and a nonionic hydrophilic group. The fluorine compound 7 is adsorbed by the silicon oxide particles 5 by the interaction of the nonionic hydrophilic group of the fluorine compound 7 with each of the silanol groups on the surfaces of the silicon oxide particles 5 by attracting each other. The fluorocarbon groups of the adsorbed fluorine compound 7 act repulsively one another, the intervals among the silicon oxide particles 5 can be broadened according to the size of the fluorine compound. Therefore, if the size of the fluorine compound is appropriately selected, the refractive index of the porous layer 3 can be decreased without causing scattering by large spaces.

The fluorocarbon group is a group in which the hydrogen atom(s) of a hydrocarbon group has/have been substituted with fluorine atom(s). One or more fluorocarbon group(s) is/are contained in one molecule of the fluorine compound 7. It is preferable that the number of the fluorocarbon groups, which have high hydrophobicity, is preferably 1 or more and 5 or less in one molecule, from the viewpoint that the fluorine compound 7 can retain affinity to the silicon oxide particles 5, which have high hydrophilicity. On the other hand, the nonionic hydrophilic group is a group having affinity to water, but contains one or more ether bond(s) (—O—) or hydroxyl group(s) (—OH), which are not ionized in water.

It is preferable that the nonionic hydrophilic group has repeating structures each represented by the following General Formula (1), and the hydrophilicity of the fluorine compound can be controlled by setting 1 to be an integer of 3 or more and 50 or less. When 1 is less than 3, the hydrophilicity is insufficient, the fluorine compound cannot be homogeneously distributed in the porous layer 3, and thus the possibility that the refractive index of the porous layer 3 does not become constant in the plane is high. When 1 is greater than 50, the fluorine compound becomes too long and the spaces among the particles are enlarged, and thus possibility that the scattering increases is high.

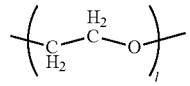

(1)

It is preferable that the fluorine compound 7 is a compound represented by the following General Formula (2) or (3).

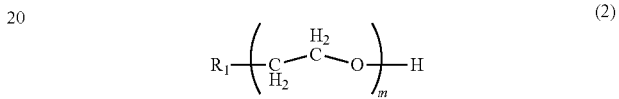

(2)

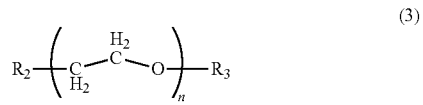

(3)

It is preferable that each of the fluorocarbon groups $R_1$ to $R_3$ is any group selected from the group consisting of a perfluoroalkyl group, a perfluoroalkenyl group, a perfluoroalkynyl group, a partially fluorinated alkyl group, a partially fluorinated alkenyl group, and a partially fluorinated alkynyl group, which having 4 or more and 15 or less carbon atoms. It is preferable that m and n are each 3 or more and 50 or less.

It is preferable that the fluorine compound 7 has a branched perfluoroalkyl group or a branched perfluoroalkenyl group, and it is more preferable that the fluorine compound 7 has a fluorocarbon group represented by General Formula (4) from the viewpoint that an effect to decrease a refractive index can be obtained with a smaller addition amount.

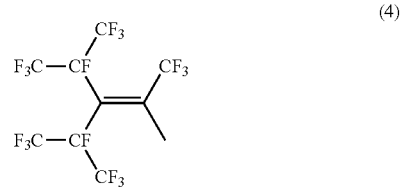

(4)

It is preferable that the fluorine content of the fluorine compound 7 is 10% by mass or more and 60% by mass or less. If the fluorine content is less than 10% by mass, the adsorption force of the fluorine compound 7 against the silicon oxide particles 5 becomes too strong, and thus the possibility that the silicon oxide particles 5 aggregate to form voids, and scattering is increased, is increased. If the fluorine content is greater than 60% by mass, the bonding force of the hydrophilic group is weakened, the fluorine compound 7 becomes difficult to adsorb by the silicon oxide particles 5, and thus the refractive index may not decrease sufficiently.

When the silicon oxide particles 5 contained in the porous layer 3 is 100% by mass, the amount of the fluorine compound 7 contained in the porous layer 3 is 0.1% by mass or more and 2.5% by mass or less. When the amount of the fluorine compound 7 is less than 0.1% by mass, the repulsion force among the fluorocarbon groups is small, and thus the effect to decrease the refractive index cannot be sufficiently obtained. If the amount is greater than 2.5% by mass, the spaces in the porous layer 3 becomes too large, and thus the scattering becomes significant, or the ratio of the fluorine compound having a higher refractive index than that of the silicon oxide increases, and thus increase in the refractive index is rather caused. The % by mass of the fluorine compound included in the porous layer with respect to the silicon oxide particles can be measured by separating the porous layer from the substrate and subjecting the porous layer to a mass analysis. Since the porous layer of the present disclosure has appropriate film evenness for use in an optical member, it is not necessary to peel the entirety of the porous layer from the substrate and measure the porous layer, and if a volume of 30% or more of the porous layer is measured, the volume can be used as a value of % by mass of the fluorine compound with respect to the silicon oxide particles contained in the porous layer.

(Porous Layer)

As explained above, by appropriately adjusting the short diameter and long diameter of the chainlike particles, the kind and addition amount of the binder, the molecular size and addition amount of the fluorine compound, and the like, a porous film that is preferable as an antireflection layer for an optical member can be attained. Here, the properties of the porous layer of the present disclosure, which is preferable as an antireflection layer, will be explained.

It is preferable that the porosity of the porous layer 3 is 30% or more and 55% or less. If the porosity is less than 30%, the refractive index is high, and a sufficient antireflection effect cannot be obtained in some cases, whereas when the porosity is greater than 55%, the spaces among the particles become too great, and thus the wearing resistance is lowered.

The refractive index of the porous layer 3 is preferably 1.21 or more and 1.27 or less with respect to light at a wavelength of 550 nm. At a refractive index of less than 1.21, the wearing resistance of the porous layer is sometime insufficient, whereas at a refractive index of greater than 1.27, an antireflection effect is not obtained sufficiently in some case.

The surface of the porous layer 3 is preferably such that a contact angle of pure water at room temperature of 23° C. and a humidity of 45% RH is 3° or more and less than 400. Where the contact angle of pure water is less than 3°, it is possible that moisture and the like easily enter the film from the surface of the porous layer 3 and thus the environment stability is lost, whereas where the contact angle is greater than 400, the unevenness of the refractive index sometimes becomes significant due to the localization of the fluorine compound 7.

It is preferable that the silicon oxide particles 5 in the porous layer 3 interact with the fluorine compound 7 by attracting each other, and whether or not any interaction occurs can be confirmed from an infrared absorption spectrum of the porous layer 3. Since the silicon oxide particles 5 are hydrophilic silicon oxide particles, the infrared absorption spectrum thereof shows an absorption derived from an Si—O stretching vibration of a silanol (Si—OH) group having a peak in 950 to 990 $cm^{-1}$. On the other hand, in the porous layer 3 containing the silicon oxide particles 5, the silicon oxide binder 6, and the fluorine compound 7, the absorption peak derived from the Si—O stretching vibration in the silanol group is shifted to the low wavelength side by the interaction of the silanol group and the fluorine compound 7 by attracting each other. It is preferable that an absorption peak derived from an Si—O stretching vibration is in the range of 900 to 945 $cm^{-1}$, since the interaction between the silicon oxide particles 5 and the fluorine compound 7 has a sufficient strength for decreasing the refractive index of the porous layer 3. At a wavelength side higher than that range, the refractive index is not sufficiently decreased, whereas at a wavelength side less than that that range, the interaction between the silicon oxide particles 5 and the fluorine compound 7 is too strong, and thus it is possible that the bonding between the silicon oxide particles 5 and the silicon oxide binder 6 is inhibited and thus the strength of the film becomes insufficient.

Furthermore, the thickness of the porous layer 3 is preferably 80 nm or more and 200 nm or less, more preferably 100 nm or more and 160 nm or less. Where the film thickness is less than 80 nm, a wearing resistance is difficult to obtain, whereas when the thickness goes beyond 200 nm, it becomes difficult to decrease the reflectance.

In order to impart water repellent property or oil repellent property to the surface of the optical member 1 having the porous layer 3 in the present disclosure, a polymer layer and the like can be disposed on the surface of the porous layer 3. In a case where oil repellent property is imparted to the surface of the optical member 1, the contact angle at the surface of the polymer layer and hexadecane at room temperature of 23° C. and a humidity of 45% RH is preferably 50° or more and 80° or less. More preferably, the contact angle is 600 or more and 750 or less. In a case where the hexadecane contact angle is less than 500, the effect of suppressing oil diffusion is lowered, whereas where the contact angle is greater than 80°, it is possible that the polymer adheres to the surface of the porous layer in shapes of large islands and causes scattering of light.

(Oxide Laminated Body)

In order to further increase the antireflection effect of the optical member 1 having a porous layer, it is also preferable to dispose an oxide laminated body 8 in which a high-refractive-index layer and a low-refractive-index layer are laminated, between the substrate 2 and the porous layer 3. The reflection can further be decreased by utilizing interference in the oxide laminated body 8. It is preferable to select the materials used in the high-refractive-index layer and the low-refractive-index layer with consideration for the refractive index of the substrate 2 and the refractive index of the porous layer 3. As the high-refractive-index layer, a layer containing zirconium oxide, titanium oxide, tantalum oxide, niobium oxide, or hafnium oxide can be used. Furthermore, as the low-refractive-index layer, a layer containing silicon oxide or magnesium fluoride can be used.

[Method for Manufacturing Optical Member]

Secondly, the method for manufacturing the optical member 1 of the present disclosure will be explained, but the method is not limited to the manufacturing method explained here as long as the above-mentioned porous film 3 can be formed on the substrate 2. The method for manufacturing the optical member 1 according to the present disclosure includes the following steps.

(I) A step of applying a liquid containing silicon oxide particles 5, a silicon oxide binder 6, a fluorine compound 7 having a fluorocarbon group and a nonionic hydrophilic group, and a solvent (hereinafter a coating liquid) on a substrate 2 to form a coating film.

(II) A step of drying and/or baking the substrate on which the coating film has been formed to form a porous layer 3.

Before conducting the above-mentioned steps of (I) and (II), the coating liquid is firstly prepared.

The coating liquid is prepared by a method for mixing a silicon oxide binder solution that has been prepared in advance in a dispersion liquid of the silicon oxide particles 5. Since the fluorine compound 7 does not chemically react with the silicon oxide particles 5 and the silicon oxide binder 6, the fluorine compound 7 may be added to the dispersion liquid of the silicon oxide binder solution or the silicon oxide particles 5 in advance, or may be added after the binder solution has been mixed with the dispersion liquid of the silicon oxide particles 5. It is preferable that the coating liquid contains the silicon oxide particles 5 by 2% by mass or more and 10% by mass or less of the entirety of the liquid, and the coating liquid further contains 0.1 to 2.5% by mass of the fluorine compound with respect to the silicon oxide.

For the silicon oxide binder solution, it is preferable to use a solution containing a silicate hydrolysis condensate as a major component, wherein said silicate hydrolysis condensate is prepared by adding water, an acid, or a base to a silicate ester such as methyl silicate, ethyl silicate, or the like in a solvent and conducting hydrolysis condensation. The acid that can be used for the condensation reaction is hydrochloric acid, nitric acid, or the like, and the base is ammonia, various amines, or the like, and it is preferable to select the acid and base with consideration for the solubility in the solvent or the reactivity of the silicate ester.

The silicon oxide binder solution can also be prepared by neutralizing and condensing a silicate such as sodium silicate in water, and diluting with a solvent. The acids that can be used for the neutralization are hydrochloric acid, nitric acid, and the like. In preparing the binder solution, it is also possible to heat at a temperature of 80° C. or less. Otherwise, a method for conducting a reaction by adding the raw materials of the silicon oxide binder 6 to the dispersion liquid of the silicon oxide particles 5 can also be used. Specifically, the reaction is conducted by adding ethyl silicate, water, and an acid catalyst to the dispersion liquid of the silicon oxide particles 5, and conducing heating and the like as necessary.

The weight average molecular weight of the silicon oxide condensate contained in the silicon oxide binder solution is preferably 500 or more and 3,000 or less in terms of polystyrene. Where the weight average molecular weight is less than 500, cracks after curing are easily formed, and the stability of a coating material is lowered. Where the weight average molecular weight is more than 3,000, the viscosity increases, and the dispersion state of the particles in the coating liquid tends to be uneven. Thus, large voids are easily generated.

In synthesizing the silicon oxide binder 6, a trifunctional silane alkoxide substituted with organic groups such as methyltriethoxysilane and ethyltriethoxysilane can be added for the purpose of improving solubility and coating property. The addition amount of the trifunctional silane alkoxide is preferably 10 mol % or less of the entirety of the silane alkoxide. Where the addition amount is greater than 10 mol %, organic groups inhibit the hydrogen bonds among the silanol groups in the binder, and thus the wearing resistance is lowered.

The amount of the silicon oxide binder 6 in the coating liquid is such that the mass where the silicon oxide binder is converted to a silicon oxide by condensation is preferably 3% by mass or more and 30% by mass or less, more preferably 5% by mass or more and 20% by mass or less with respect to 100% by mass of the silicon oxide particles 5. Where the amount of the silicon oxide binder in the coating liquid is less than 3% by mass, the wearing resistance of the film is sometimes decreased, whereas where the amount is greater than 30% by mass, the spaces are occluded by the binder and thus the refractive index of the porous layer 3 cannot be decreased, and thus a sufficient antireflective property cannot be sometimes obtained.

The solvents that can be used for the dispersion liquid of the silicon oxide particles and the solution of the silicon oxide binder can be any solvents as long as the raw materials are homogeneously dissolved and the reaction product is not precipitated therein. Examples include monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; di- or more hydric alcohols such as ethylene glycol and triethylene glycol; ether alcohols such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, dibutyl ether, and cyclopentyl methyl ether; esters such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; various aliphatic-based or alicyclic-based hydrocarbons such as n-hexane, n-octane, cyclohexane, cyclopentane, and cyclooctane; various aromatic hydrocarbons such as toluene, xylene, and ethylbenzene; various ketones such as acetone, methyl ethyl ketone, methyl isobutyl ketone, cyclopentanone, and cyclohexanone; various chlorinated hydrocarbons such as chloroform, methylene chloride, carbon tetrachloride, and tetrachloroethane; aprotic polarized solvents such as N-methylpyrrolidone, N,N-dimethylformamide, N,N-dimethylacetamide, and ethylenecarbonate; and the like. Two kinds of the solvents can be mixed and used.

Examples of the method for applying the coating liquid onto the substrate include a spin coat process, a blade coat process, a roll coat process, a slit coat process, a printing process, a dip coat process, and the like. In the case where an optical member having a sterically complex shape such as a concave surface is produced, a spin coat process is preferable in view of evenness of film thickness.

A coating film is formed by applying a coating liquid onto a substrate, and the coating film is then dried and/or cured. The drying and curing are steps for removing the solvent, and for promoting the reaction in the silicon oxide binder or between the silicon oxide binder and the silicon oxide particles. The temperature for the drying and curing is preferably 20° C. or more and 200° C. or less, more preferably 60° C. or more and 150° C. or less. Where the temperature for the drying and curing is less than 20° C., the solvent remains, and thus the wearing resistance of the film is lowered. Where temperature for the drying and curing is greater than 200° C., the curing of the binder excessively proceeds, and cracks are easily generated in the binder. The time for the drying and curing is preferably 5 minute or more and 24 hours or less, more preferably 15 minutes or more and 5 hours or less. Where the time for the drying and curing is less than 5 minutes, the solvent partially remains and thus the unevenness of the refractive index in the plane sometimes becomes significant, and where the time is longer than 24 hours, cracks are easily generated in the binder.

EXAMPLES

The present disclosure will be specifically explained with referring to Examples. However, the present disclosure is not limited by the following Examples as long as the present disclosure does not go beyond the gist thereof.

Before explaining the respective Examples, the method for preparing a coating liquid and the method for evaluating a film used in these Examples will be explained.

(Preparation of Coating Liquid)

(1) Preparation of Coating Liquid 1 Containing Chainlike Silicon Oxide Particles 2-propanol (IPA) was distilled off from an IPA dispersion liquid of chainlike silicon oxide particles (IPA-ST-UP manufactured by Nissan Chemical Industries, Ltd., average particle size: 12 nm, solid content concentration: 15% by mass) (500 g) while adding 1-ethoxy-2-propanol thereto. By this way, 2060.8 g of a dispersion liquid having a solid content concentration of 3.64% by mass was obtained.

Subsequently, 54 g of a 0.01 mol/l diluted hydrochloric acid was slowly added to a mixed solution of 62.6 g of ethyl silicate and 36.8 g of 1-ethoxy-2-propanol. The obtained solution was stirred at room temperature for 90 minutes, and further heated at 40° C. for 1 hour, whereby a silicon oxide binder solution having a solid content concentration of 11.8% by mass was prepared.

To a dispersion liquid of 1-ethoxy-2-propanol in which chainlike silicon oxide particles had been dispersed was slowly added 95.5 g of the silicon oxide binder solution, and the mixture was stirred at room temperature for 2 hours, whereby coating liquid 1 containing the chainlike silicon oxide particles was prepared.

When the prepared coating liquid 1 was subjected to a particle size distribution measurement by a kinetic light scattering process (manufactured by Marvern, Zetasizer Nano ZS), it was confirmed that chainlike silicon oxide particles each having a short diameter of 11 nm and a long diameter of 77 nm had been dispersed in the solution.

(2) Preparation of Coating Liquids 2 to 11 Containing Chainlike Silicon Oxide Particles Different kinds of fluorine compounds or polyethylene glycols (manufactured by Tokyo Kasei, average molecular weight: 300 g/mol) were each added, with changing the addition amount to coating liquid 1 containing 100 g of chainlike silicon oxide particles, and the mixtures were stirred for 30 minutes, whereby coating liquids 2 to 11 containing chainlike silicon oxide particles were prepared. The specific components of the respective coating liquids are collectively shown in Table 1 below. By a similar particle size distribution measurement to that for coating liquid 1, it was confirmed that chainlike silicon oxide particles each having a short diameter of 11 to 12 nm and a long diameter of 70 to 77 nm had been dispersed in the respective coating liquids.

The fluorine compounds used in the respective Examples have 1 to 3 fluorocarbon group(s) Rf represented by the following General Formula in one molecule.

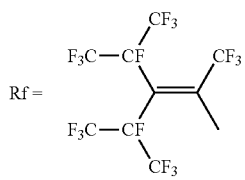

Furthermore, the fluorine compounds have a hydrophilic group represented by the following General Formula.

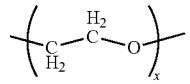

Specifically, a fluorine compound having a number of repeating x of 8 or more and 45 or less on average, and having an average fluorine content of approximately 22% by mass or more and 50% by mass (Ftergent manufactured by Neos Company Ltd.) was used.

(Evaluation of Film)

(3) Measurement of Film Thickness

A measurement was conducted by using a spectroscopic ellipsometer (VASE, manufactured by J. A. Woollam Co., Inc.) at wavelengths from 380 nm to 800 nm, and a film thickness was obtained from an analysis.

(4) Measurement of Refractive Index

A measurement was conducted by using a spectroscopic ellipsometer (VASE) at wavelengths from 380 nm to 800 nm. The refractive index at a wavelength of 550 nm was deemed as a refractive index. The average reflectance was evaluated according to the following criteria.

A: The average reflectance is 1.235 or less.
B: The average reflectance is more than 1.235 and 1.25 or less (5) Measurement of Reflectance Using a reflectance measurement apparatus (USPM-RU manufactured by Olympus Corporation), absolute reflectances at wavelengths from 380 nm to 780 nm were measured, and the maximum value of the reflectances at wavelengths from 450 to 650 nm was obtained. The maximum value of the reflectances was evaluated by the following criteria.

A: The maximum value is 0.05% or less
B: The maximum value is more than 0.05% and 0.1% or less (6) Evaluation of Contact Angle Using a full automatic contact angle meter (DM-701 manufactured by Kyowa Interface Science Co., Ltd.), a contact angle when a droplet of 2 μl of pure water was contacted was measured in an environment at 23° C. and 40% RH. The contact angle was evaluated according to the following criteria.

(7) Measurement of Minute Light Scattering

A 150 W halogen fiber illumination apparatus (PHL-150C) as a light source was used. The light emitted from the halogen fiber illumination apparatus passed through a rod homogenizer (RHO-13S-E2), and the illuminance was adjusted to 4,000 lx by an iris diaphragm. The light was allowed to enter vertically a surface with a porous layer of an optical member, and the rear surface of the optical surface was photographed by a camera (Canon EOS70D) equipped with a camera lens (Compact-Macro Lens EF 50 mm) from an angle of 45° with respect to the rear surface. The conditions for the photographing were a shutter speed of 10 seconds, a diaphragm F10, and ISO400.

The obtained image was analyzed by general-purpose image processing software (Adobe Photoshop). Pixels in 700×700 were quantified, and a luminance was represented by a natural number. The luminance was evaluated according to the following criteria.

A: The luminance is 25 or less
B: The luminance is greater than 25 and 30 or less
C: The luminance is greater than 30

(8) Evaluation of Wearing Resistance

A load of 300 g/cm$^2$ was applied onto a sample by a polyester wiper (Alpha Wiper TX1009 manufactured by Texwipe), the polyester wiper was reciprocated 20 times, and the presence or absence of scratch and wear mark was visually observed. The wearing resistance was evaluated according to the following criteria.

A: No change was seen in the sample.
B: The sample was not scratched, but a wear mark was seen.
C: The sample was scratched.

(9) Measurement of Infrared Ray Absorption Spectrum

Only the porous layer formed on the substrate or the oxide laminated body was scraped off, and formed into a powdery form. The infrared ray absorption spectrum of the obtained powder was measured by using a Fourier conversion infrared ray spectrometer (trade name: Spectrum One, manufactured by Parkin Elmer) equipped with a universal ATR (Attenuated Total Reflection) sampling unit. From the measurement result, an absorption peak wave number of the Si—O stretching vibration of the silanol (Si—OH) group in the range of 900 to 980 cm$^{-1}$ was obtained. A: A peak is seen in 900 to 945 cm$^{-1}$.
B: No peak is seen in 900 to 945 cm$^{-1}$.

Example 1

A suitable amount of coating liquid 2 containing chainlike silicon oxide particles was added dropwise onto a glass substrate having a diameter ($\varphi$) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 2.0% by mass of a fluorine compound with respect to 100% by mass of the chainlike silicon oxide particles, the silicon oxide binder, and the particles. The fluorine compound contained in the film was Ftergent 251 (product name) manufactured by Neos Company Ltd., which has Rf of 1, x of 8 on average, and a fluorine content of 40% by mass on average.

The obtained porous layer had a refractive index of 1.231, a film thickness of 120 nm, and a contact angle of pure water of 11°. Furthermore, the optical member had a minute light scattering value of 23, and the sample had not been changed at the time of wiping.

Example 2

A suitable amount of coating liquid 3 containing chainlike silicon oxide particles was added dropwise onto a glass substrate having a diameter ($\varphi$) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.68% by mass of a fluorine compound with respect to 100% by mass of the chainlike silicon oxide particles, the silicon oxide binder, and the particles. The fluorine compound contained in the film was Ftergent 212M (product name) manufactured by Neos Company Ltd., which has Rf of 1, x of 12 on average, and a fluorine content of 33% by mass on average.

The obtained porous layer had a refractive index of 1.228, a film thickness of 118 nm, and a contact angle of pure water of 9°. Furthermore, the optical member had a minute light scattering value of 21, and the sample had not been changed at the time of wiping.

Example 3

A suitable amount of coating liquid 4 containing chainlike silicon oxide particles was added dropwise onto a glass substrate having a diameter ($\varphi$) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.63% by mass of a fluorine compound with respect to 100% by mass of the chainlike silicon oxide particles, the silicon oxide binder, and the particles. The fluorine compound contained in the film is Ftergent 215M (product name) manufactured by Neos Company Ltd., which has Rf of 1, x of 15 on average, and a fluorine content of 29% by mass on average.

The obtained porous layer had a refractive index of 1.232, a film thickness of 119 nm, and a contact angle of pure water of 8°. Furthermore, the optical member had a minute light scattering value of 22, and the sample had not been changed at the time of wiping.

Example 4

A suitable amount of coating liquid 5 containing chainlike silicon oxide particles was added dropwise onto a glass substrate having a diameter ($\varphi$) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.68% by mass of a fluorine compound with respect to 100% by mass of the chainlike silicon oxide particles, the silicon oxide binder, and the particles. The fluorine compound contained in the film was Ftergent 209F (product name) manufactured by Neos Company Ltd., which has Rf of 2, x of 9 on average, and a fluorine content of 50% by mass on average.

The obtained porous layer had a refractive index of 1.228, a film thickness of 119 nm, and a contact angle of pure water of 12°. Furthermore, the optical member had a minute light scattering value of 20, and the sample had not been changed at the time of wiping.

Example 5

A suitable amount of coating liquid 6 containing chainlike silicon oxide particles was added dropwise onto a glass substrate having a diameter ($\varphi$) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.50% by mass of a fluorine compound with respect to 100% by mass of the chainlike silicon oxide particles, the silicon oxide binder, and the particles. The fluorine compound contained in the film is Ftergent 222F (product name) manufactured by Neos Company Ltd., which has Rf of 2, x of 22 on average, and a fluorine content of 34% by mass on average.

The obtained porous layer had a refractive index of 1.231, a film thickness of 118 nm, and a contact angle of pure water of 9°. Furthermore, the optical member had a minute light scattering value of 22, and the sample had not been changed at the time of wiping.

Example 6

A suitable amount of coating liquid 7 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.75% by mass of a fluorine compound with respect to 100% by mass of the chainlike silicon oxide particles, the silicon oxide binder, and the particles. The fluorine compound contained in the film is Ftergent 222F (product name) manufactured by Neos Company Ltd., which has Rf of 2, x of 22 on average, and a fluorine content of 34% by mass on average.

The obtained porous layer had a refractive index of 1.222, a film thickness of 121 nm, and a contact angle of pure water of 10°. Furthermore, the optical member had a minute light scattering value of 22, and the sample had not been changed at the time of wiping.

Example 7

A suitable amount of coating liquid 8 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.38% by mass of a fluorine compound with respect to 100% by mass of the chainlike silicon oxide particles, the silicon oxide binder, and the particles. The fluorine compound contained in the film is Ftergent 222F (product name) manufactured by Neos Company Ltd., which has Rf of 2, x of 22 on average, and a fluorine content of 34% by mass on average.

The obtained porous layer had a refractive index of 1.225, a film thickness of 121 nm, and a contact angle of pure water of 8°. Furthermore, the optical member had a minute light scattering value of 21, and the sample had not been changed at the time of wiping.

Comparative Example 1

A suitable amount of coating liquid 1 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer formed of chainlike silicon oxide particles and a silicon oxide binder.

The obtained porous layer had a refractive index of 1.240, a film thickness of 114 nm, and a contact angle of pure water of 8°. Furthermore, the optical member had a minute light scattering value of 22, and the sample had not been changed at the time of wiping.

Comparative Example 2

A suitable amount of coating liquid 9 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 3.00% by mass of a fluorine compound with respect to 100% by mass of the chainlike silicon oxide particles, the silicon oxide binder, and the particles. The fluorine compound contained in the film is Ftergent 251 (product name) manufactured by Neos Company Ltd., which has Rf of 1, x of 8 on average, and a fluorine content of 40% by mass on average.

The obtained porous layer had a refractive index of 1.236, a film thickness of 122 nm, and a contact angle of pure water of 15°. On the other hand, the optical member had a minute light scattering value of greater than 30, and the sample had been scratched after the wiping.

Comparative Example 3

A suitable amount of coating liquid 10 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 0.65% by mass of a polyethylene glycol containing only hydrophilic groups and containing no fluorinated organic groups (manufactured by Tokyo Kasei, average molecular weight: 300 g/mol) with respect to 100% by mass of the chainlike silicon oxide particles, the silicon oxide binder, and the particles.

The obtained porous layer had a refractive index of 1.239, a film thickness of 115 nm, and a contact angle of pure water of 8°, and any effect to decrease the refractive index was not observed. On the other hand, the optical member had a minute light scattering value of 24, and the sample had not been changed at the time of wiping.

Comparative Example 4

A suitable amount of coating liquid 11 containing chainlike silicon oxide particles was added dropwise onto a glass substrate having a diameter (φ) of 30 mm and a thickness of 1 mm (nd=1.77, vd=50), and spin coating was conducted at 3,500 rpm for 20 seconds, whereby a coating film was formed on the substrate. The coating film was heated in a hot air circulation oven at 140° C. for 30 minutes to prepare an optical member having a porous layer. The formed porous layer contained 1.80% by mass of a polyethylene glycol containing only hydrophilic groups and containing no fluorinated organic groups (manufactured by Tokyo Kasei, average molecular weight: 300 g/mol) with respect to 100% by mass of the chainlike silicon oxide particles, the silicon oxide binder, and the particles.

The obtained porous layer had a refractive index of 1.228, a film thickness of 122 nm, and a contact angle of pure water of 8°. On the other hand, the optical member had a minute light scattering value of greater than 30. The sample had not been scratched at the time of wiping, but a rubbing mark was observed.

The results obtained for Examples 1 to 7 and Comparative Examples 1 to 4 are summarized in Table 1. It is understood from this table that the porous layer containing no fluorine compound formed in Comparative Example 1 had a refractive index of 1.240, whereas the porous layers containing a fluorine compound formed in Examples 1 to 7 had low refractive indices of 1.222 to 1.235. Furthermore, both Comparative Examples and Examples 1 to 7 showed equally low scattering as indicated by minute scattering values of 20 to 23. On the other hand, it was indicated that, when the addition amount of the fluorine compound was too much as in Comparative Example 2, the refractive index of the porous layer was rather raised.

Furthermore, it was shown that the effect to decrease the refractive index of little in Comparative Example 3 even a compound having only hydrophilic groups and having no fluorocarbon groups is added, and that, when the compound is added in a large amount as in Comparative Example 4, the refractive index was decreased, but the scattering was significantly deteriorated (minute scattering value was greater than 30).

It was able to be confirmed from the above-mentioned results that porous layers containing a fluorine compound in an amount of 0.1 to 2.5% by mass with respect to 100% by mass of the silicon oxide particles can provide excellent properties in all of the refractive index, scattering, and wearing resistance.

surface, and spin coating was conducted at 3,500 rpm for 20 seconds, whereby a coating film was formed on the substrate. The oxide laminated body was a laminate of films each having the film thickness and refractive index shown in Table 2. The coating film was heated in a hot air circulation oven at 140° C. for 30 minutes to prepare an optical member having an antireflection film including an oxide laminate and a porous layer. The formed porous layer contained 2.00% by mass of a fluorine compound (product name Ftergent 251 manufactured by Neos Company Ltd.: Rf of 1, x of 8 on average, and a fluorine content of 40% by mass on average) with respect to 100% by mass of the chainlike silicon oxide particles, the silicon oxide binder, and the particles.

Figure 3:
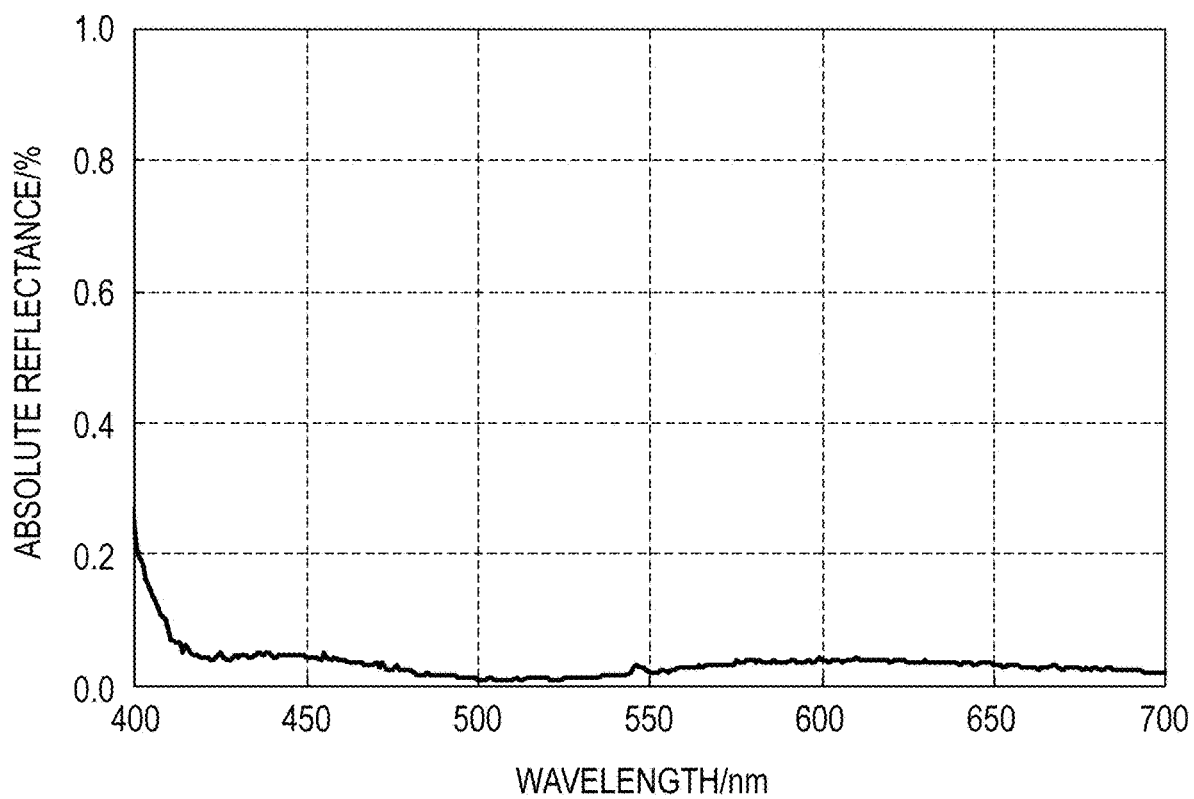
FIG. 3 is a graph showing the absolute reflectance of the surface of the antireflection film of Example 8.

A graph of the absolute reflectance of the obtained antireflection film is shown in FIG. 3. The maximum value of the reflectances at wavelengths of 450 to 650 nm was 0.049%, and thus an excellent antireflective function was indicated.

Figure 4:
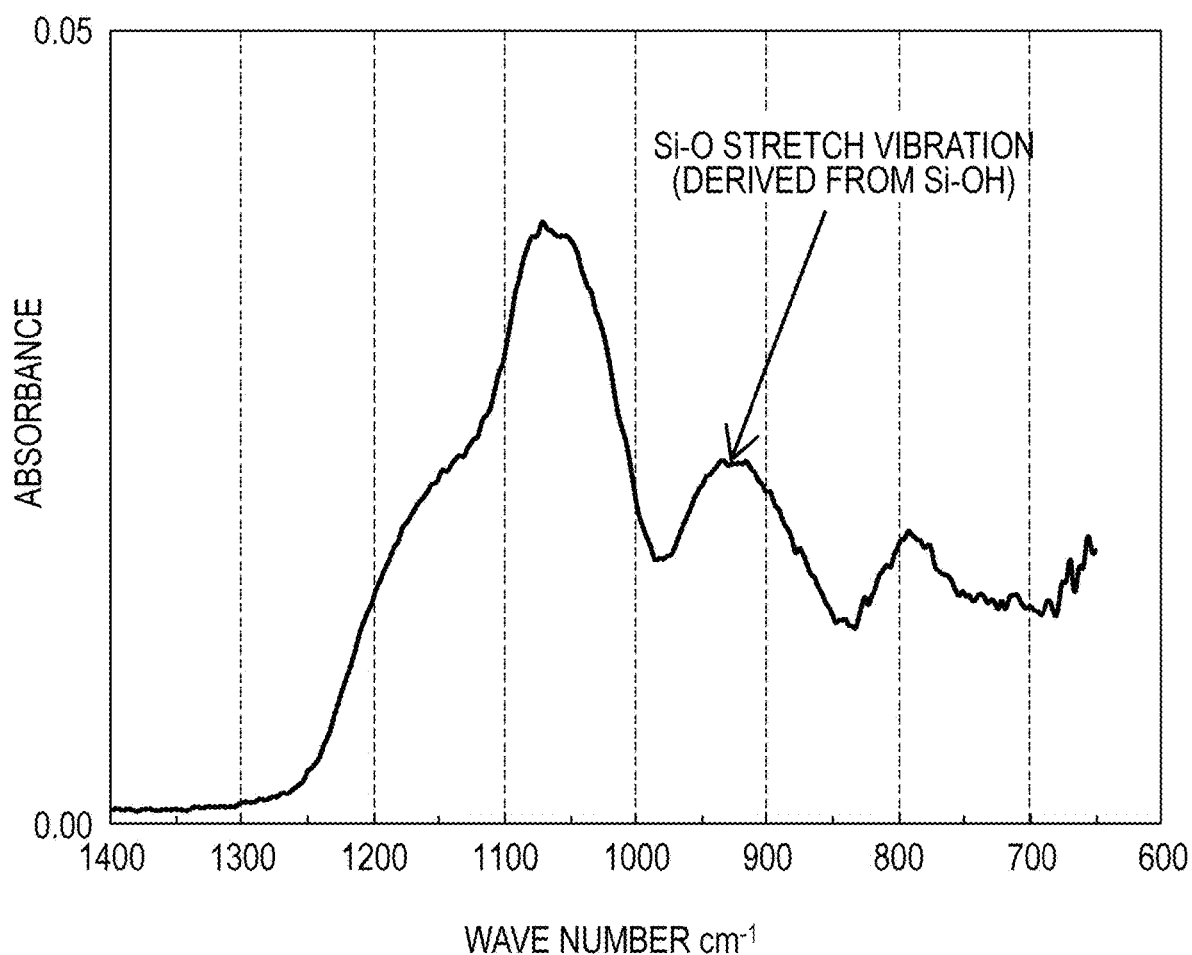
FIG. 4 is a graph showing the IR absorption spectrum of the porous layer of Example 8.

Only the porous layer of the surface layer was scraped off and formed into a powder, an infrared absorption spectrum was measured, and the result is shown in FIG. 4. The absorption peak derived from the Si—O stretching vibration of the silanol group was 934 cm$^{-1}$.

TABLE 2

| Film constitution | Refractive index λ: 550 nm | Film thickness nm |
| --- | --- | --- |
| 9$^{th}$ layer | 1.47 | 20.1 |
| 8$^{th}$ layer | 2.20 | 22.4 |
| 7$^{th}$ layer | 1.66 | 79.9 |
| 6$^{th}$ layer | 2.20 | 270.1 |

TABLE 1

| | Chainlike silicon particles coating liquid | Fluorine compound or polyethylene glycol | | | | Film properties | | | |
| --- | --- | --- | --- | --- | --- | --- | --- | --- | --- |
| | | Kind | Hydrophilic groups (repeating number) | Fluorine content % | Addition amount % by mass % | Film thickness nm | Refractive index λ: 550 nm | Minute scattering | Wearing resistance |
| Example 1 | 2 | Ftergent 251 | EO (8) | 40 | 2.00 | 120 | A 1.231 | A23 | A |
| Example 2 | 3 | Ftergent 212M | EO (12) | 33 | 0.68 | 118 | A 1.228 | A21 | A |
| Example 3 | 4 | Ftergent 215M | EO (15) | 29 | 0.63 | 119 | A 1.232 | A22 | A |
| Example 4 | 5 | Ftergent 209F | EO (9) | 50 | 0.68 | 119 | A 1.228 | A20 | A |
| Example 5 | 6 | Ftergent 222F | EO (22) | 34 | 0.50 | 118 | A 1.231 | A22 | A |
| Example 6 | 7 | Ftergent 222F | EO (22) | 34 | 0.75 | 121 | A 1.222 | A22 | A |
| Example 7 | 8 | Ftergent 245F | EO (45) | 22 | 0.38 | 121 | A 1.225 | A21 | A |
| Comparative Example 1 | 1 | None | — | — | — | 114 | B 1.240 | A22 | A |
| Comparative Example 2 | 9 | Ftergent 251 | EO (8) | 40 | 3.00 | 122 | B 1.236 | C33 | C |
| Comparative Example 3 | 10 | Polyethylene glycol 300 | EO (7) | — | 0.65 | 115 | B 1.239 | A24 | A |
| Comparative Example 4 | 11 | Polyethylene glycol 300 | EO (7) | — | 1.80 | 122 | A 1.228 | C32 | B |

Example 8

A suitable amount of coating liquid 4 containing chainlike silicon oxide particles was added dropwise onto an oxide laminated body of a glass substrate having a diameter (φ) of 30 mm and a thickness of 1 mm (nd=1.52, vd=64.1), the glass substrate having the oxide laminated body on the TABLE 2-continued

| Film constitution | Refractive index λ: 550 nm | Film thickness nm |
| --- | --- | --- |
| 5$^{th}$ layer | 1.66 | 31.7 |
| 4$^{th}$ layer | 2.20 | 20.4 |

TABLE 2-continued

| Film constitution | Refractive index λ: 550 nm | Film thickness nm |
|---|---|---|
| 3rd layer | 1.66 | 10.0 |
| 2nd layer | 2.20 | 14.9 |
| 1st layer | 1.66 | 118.7 |
| Substrate | 1.52 | — |

TABLE 3

| | Chainlike silicon particles coating liquid | Fluorine compound or polyethylene glycol | | | Refractive index maximum value % λ: 450-650 n | IR peak wave number cm$^{-1}$ 900-980 cm$^{-1}$ |
|---|---|---|---|---|---|---|
| | | Kind | Hydrophilic groups (repeating number) | Fluorine content % | Addition amount % by mass % | | |
| Example 8 | 2 | Ftergent 251 | EO (8) | 40 | 2.0 | 0.049 | A934 |
| Example 9 | 7 | Ftergent 222F | EO (22) | 34 | 0.75 | 0.043 | A930 |
| Comparative Example 5 | 1 | None | — | — | — | 0.09 | B960 |

Example 9

A suitable amount of coating liquid 7 containing chainlike silicon oxide particles was added dropwise onto an oxide laminated body of a glass substrate in a similar manner to that of Example 8, and spin coating was conducted at 3,500 rpm for 20 seconds, whereby a coating film was formed on the substrate. The coating film was heated in a hot circulation oven at 140° C. for 30 minute, whereby an optical member containing an antireflection film including an oxide laminate and a porous layer was prepared. The formed porous layer contained 0.75% by mass of the fluorine compound with respect to 100% by mass of the chainlike silicon oxide particles, the silicon oxide binder, and the particles. The fluorine compound contained in the film was Ftergent 222F (product name) manufactured by Neos Company Ltd., which has Rf of 2, x of 22 on average, and a fluorine content of 34% by mass on average.

Figure 5:
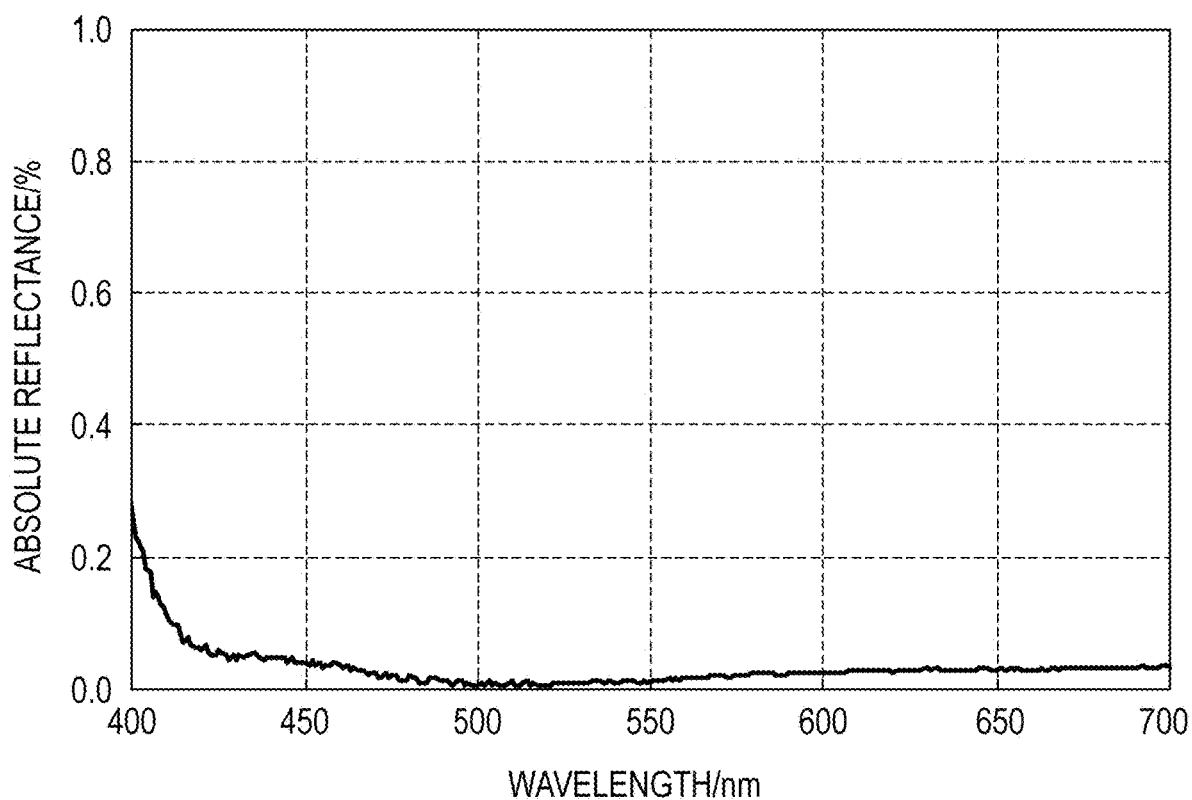
FIG. 5 is a graph showing the absolute reflectance of the surface of the antireflection film of Example 9.

A graph of the absolute reflectances of the obtained antireflection film is shown in FIG. 5. It was confirmed that the maximum value of the reflectances at wavelengths of 450 to 650 nm was 0.043%, and thus the optical member had an excellent antireflective function.

The absorption peak derived from an Si—O stretching vibration of the silanol group in the porous layer of the surface layer was 930 cm$^{-1}$.

Comparative Example 5

A suitable amount of coating liquid 1 containing chainlike silicon oxide particles was added dropwise onto an oxide laminated body of a similar glass substrate to that used in Example 8, and spin coating was conducted at 3,500 rpm for 20 seconds, whereby a coating film was formed on the substrate. The coating film was heated in a hot air circulation oven at 140° C. for 30 minutes, whereby an optical member having an antireflection film including an oxide laminate and a porous layer was prepared. The porous layer contained chainlike silicon oxide particles and a silicon oxide binder.

Figure 6:
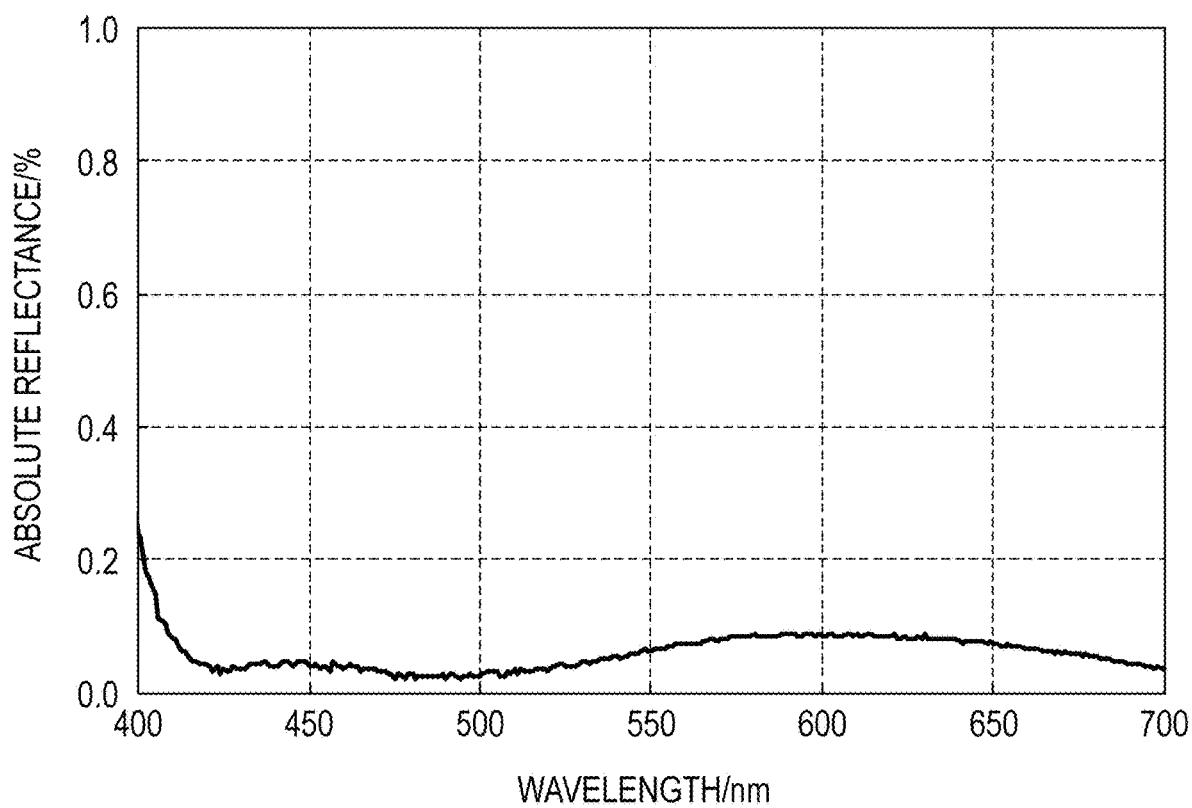
FIG. 6 is a graph showing the absolute reflectance of the surface of the antireflection film of Comparative Example 5.

The graph of the absolute reflectances of the obtained antireflection film is shown in FIG. 6. It is understood that the maximum value of the reflectances at wavelengths of 450 to 650 nm was 0.090%, which was greater than 0.050%, and thus the antireflective function was less than those in Examples 8 and 9.

Figure 7:
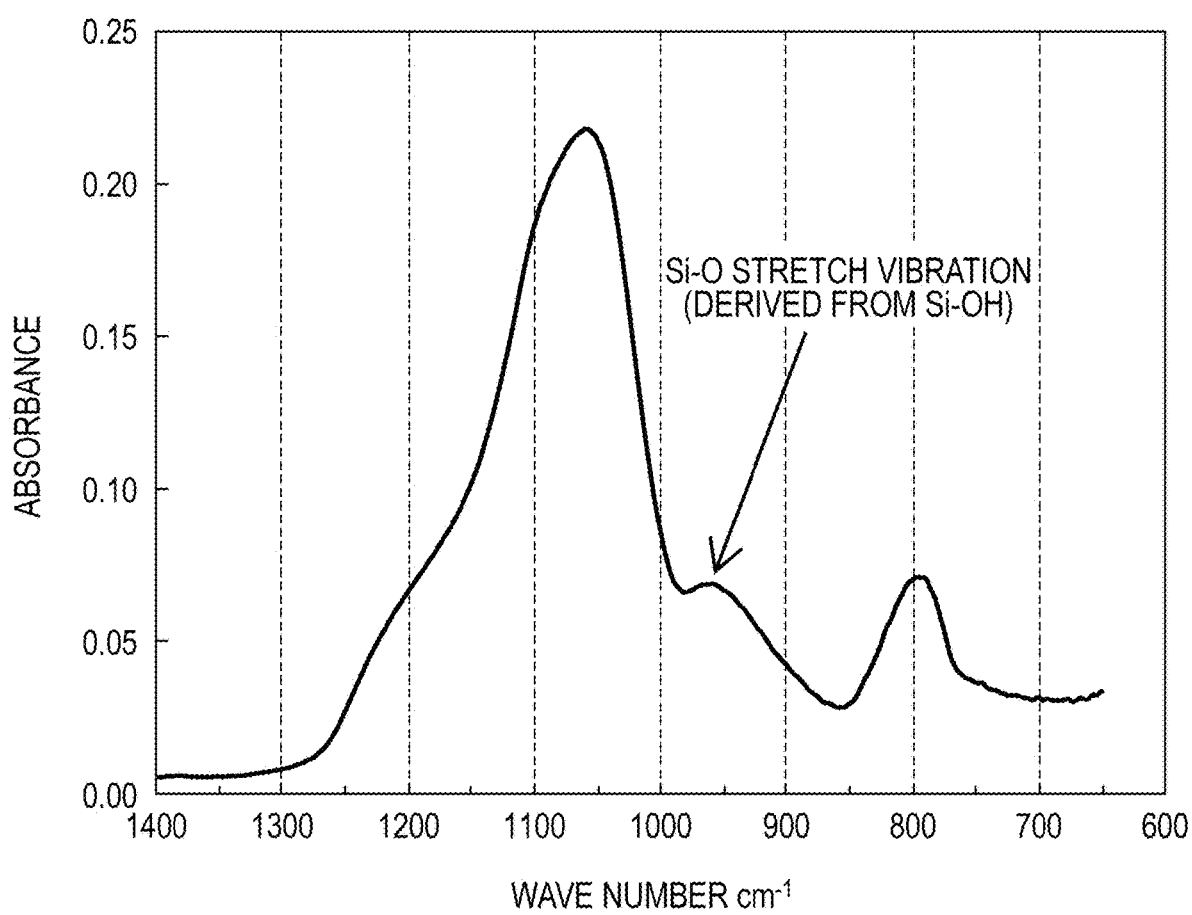
FIG. 7 is a graph showing the IR absorption spectrum of the porous layer of Comparative Example 5.

Only the porous layer of the surface layer was scraped off and formed into a powder the infrared absorption spectrum was measured, and the result is shown in FIG. 7. The absorption peak derived from the Si—O stretching vibration of the silanol group in the porous layer of the surface layer was 960 cm$^{-1}$, which was out of the 900 to 940 cm$^{-1}$.

It was able to be confirmed from the results of Examples 8 and 9 and Comparative Example 5 that the antireflection films having a porous layer containing a fluorine compound according to the present disclosure showed an excellent antireflection performance.

The optical member of the present disclosure can be utilized for imaging apparatuses such as cameras and video cameras, or projection apparatuses such as liquid crystal projectors and light scanning apparatuses in electronic picture devices.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-046632, filed Mar. 10, 2017, which is hereby incorporated by reference herein in its entirety.

What is claimed is:

1. An optical member comprising a porous layer on a substrate,
wherein the porous layer contains hydrophilic silicon oxide particles, a silicon oxide binder, and a fluorine compound,
wherein the fluorine compound has a nonionic hydrophilic group having repeating structures each represented by General Formula (1), wherein l is an integer of 3 or more and 50 or less, and

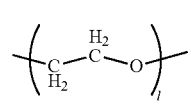

(1)

the amount of the fluorine compound is 0.1% by mass or more and 2.5% by mass or less with respect to the silicon oxide contained in the porous layer.

2. The optical member according to claim 1, wherein the amount of the fluorine compound is 0.3% by mass or more and 2.0% by mass or less with respect to the silicon oxide.

3. The optical member according to claim 1, wherein the amount of fluorine contained in the fluorine compound is 10% by mass or more and 60% by mass or less.

4. The optical member according to claim 1, wherein the porous layer has a refractive index with respect to light at a wavelength of 550 nm of 1.21 or more and 1.27 or less.

5. The optical member according to claim 1, wherein an infrared absorption spectrum of the porous layer shows an absorption derived from an Si—O stretching vibration having a peak in 900 to 945 cm-1.

6. The optical member according to claim 1, wherein the fluorine compound is represented by General Formula (2) or (3),
wherein R1 to R3 are each any group selected from the group consisting of a perfluoroalkyl group, a perfluoroalkenyl group, a perfluoroalkynyl group, a partially fluorinated alkyl group, a partially fluorinated alkenyl group, and a partially fluorinated alkynyl group each having a structure having 4 or more and 15 or less carbon atoms, and
m and n are each an integer of 3 or more and 50 or less

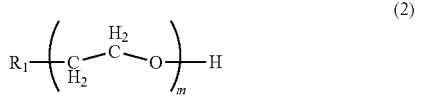

(2)

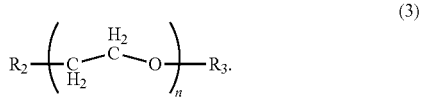

(3)

7. The optical member according to claim 1, wherein the fluorocarbon group contains a structure represented by General Formula (4)

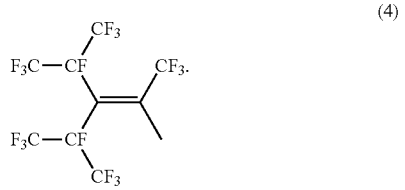

(4)

8. The optical member according to claim 1, wherein the porous layer is formed by bonded chain-like silica particles.

9. The optical member according to claim 8, wherein the silicon oxide particles are chainlike particles having an average short diameter of 5 nm or more and 40 nm or less.

10. The optical member according to claim 1, comprising, between the substrate and the porous layer, an oxide laminated body in which a first layer containing one of zirconium oxide, titanium oxide, tantalum oxide, niobium oxide, and hafnium oxide and a second layer containing one of silicon oxide and magnesium fluoride are laminated.

11. An imaging apparatus comprising an imaging unit, and an optical member comprising a porous layer on a substrate,
wherein the porous layer contains hydrophilic silicon oxide particles, a silicon oxide binder, and a fluorine compound,
wherein the fluorine compound has a nonionic hydrophilic group having repeating structures each represented by General Formula (1), wherein I is an integer of 3 or more and 50 or less, and

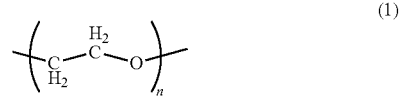

(1)

the amount of the fluorine compound is 0.1% by mass or more and 2.5% by mass or less with respect to the silicon oxide contained in the porous layer.

12. The imaging apparatus according to claim 11, wherein the porous layer is formed by bonded chain-like silica particles, and the silicon oxide particles are chainlike particles having an average short diameter of 5 nm or more and 40 nm or less.

13. A method for manufacturing an optical member having a porous layer on a substrate, the method comprising:
forming a coating film by applying onto the substrate a liquid containing hydrophilic silicon oxide particles, a silicon oxide binder, a fluorine compound, and a solvent; and
forming a porous layer by drying and/or baking the substrate on which the coating film has been formed,
wherein the fluorine compound has a nonionic hydrophilic group having repeating structures each represented by General Formula (1), wherein I is an integer of 3 or more and 50 or less, and

(1)

the amount of the fluorine compound contained in the liquid is 0.1% by mass or more and 2.5% by mass or less with respect to the silicon oxide contained in the silicon oxide particles and the silicon oxide binder.

14. The method for manufacturing an optical member according to claim 13, wherein the amount of fluorine contained in the fluorine compound is 10% by mass or more and 60% by mass or less.

15. The method for manufacturing an optical member according to claim 13, wherein the fluorine compound is represented by General Formula (2) or (3),
wherein R1 to R3 are each any group selected from the group consisting of a perfluoroalkyl group, a perfluoroalkenyl group, a perfluoroalkynyl group, a partially fluorinated alkyl group, a partially fluorinated alkenyl group, and a partially fluorinated alkynyl group each having 4 or more and 15 or less carbon atoms, and
m and n are each an integer of 3 or more and 50 or less

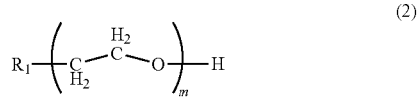

(2)

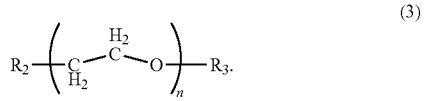

(3)

16. The method for manufacturing an optical member according to claim 13, wherein the fluorocarbon group contains a structure represented by General Formula (4)

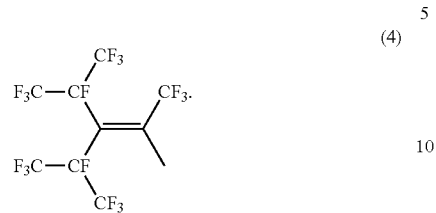

(4)

17. The method for manufacturing an optical member according to claim 13 wherein the amount of the fluorine compound contained in the liquid is 0.3% by mass or more and 2.0% by mass or less with respect to the silicon oxide contained in the silicon oxide particles and the silicon oxide binder.

* * * * *